Figure 1:
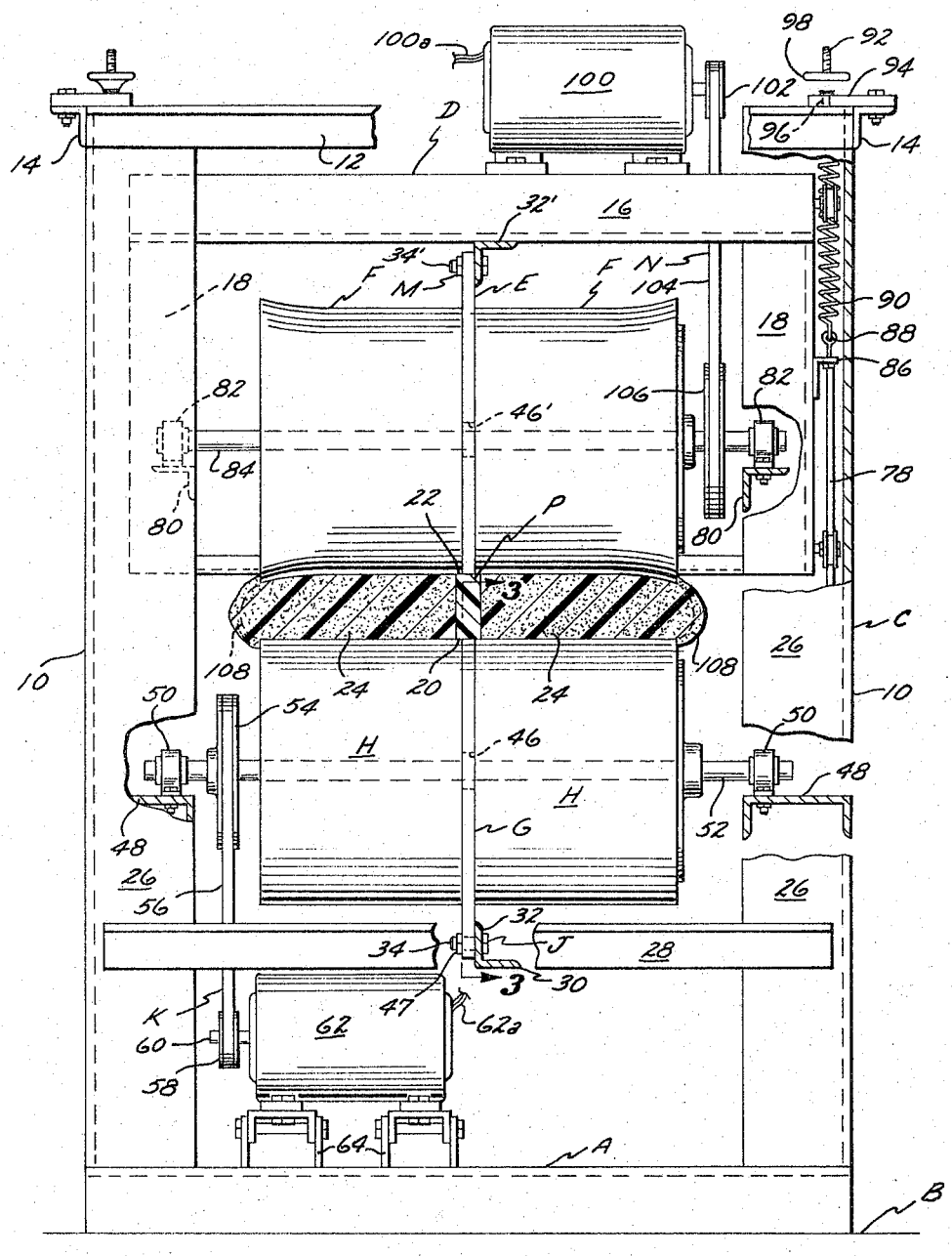

March 7, 1967

M. E. LAWSON 3,307,297

SURFBOARD FORMING APPARATUS AND
METHOD OF USING SAME

Filed Sept. 21, 1964

2 Sheets-Sheet 1

INVENTOR.
MARK E. LAWSON
BY
William C. Babcock
ATTORNEY

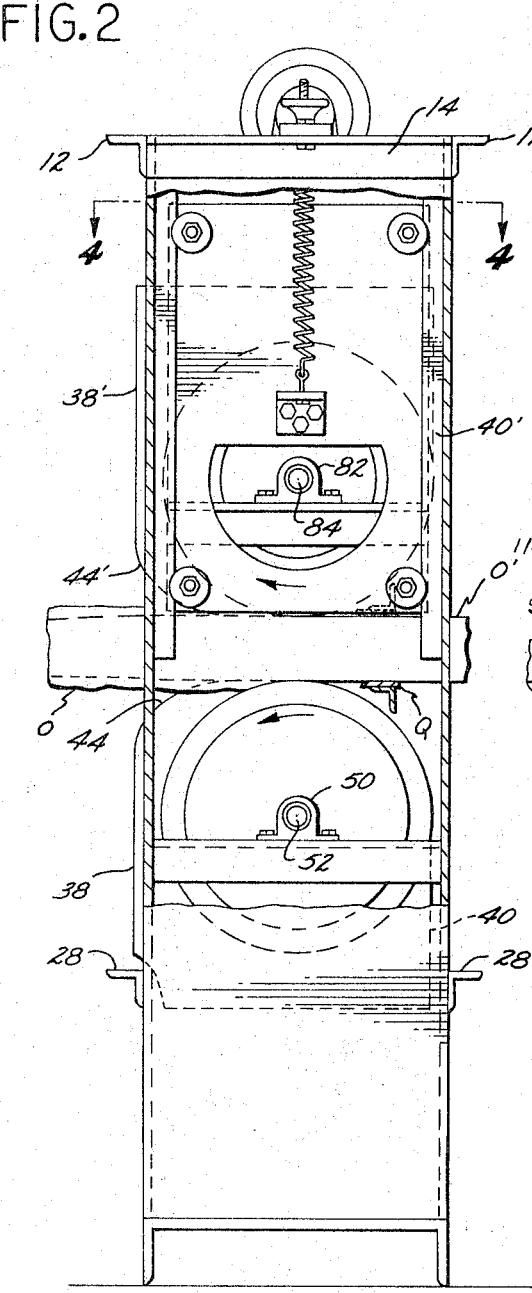
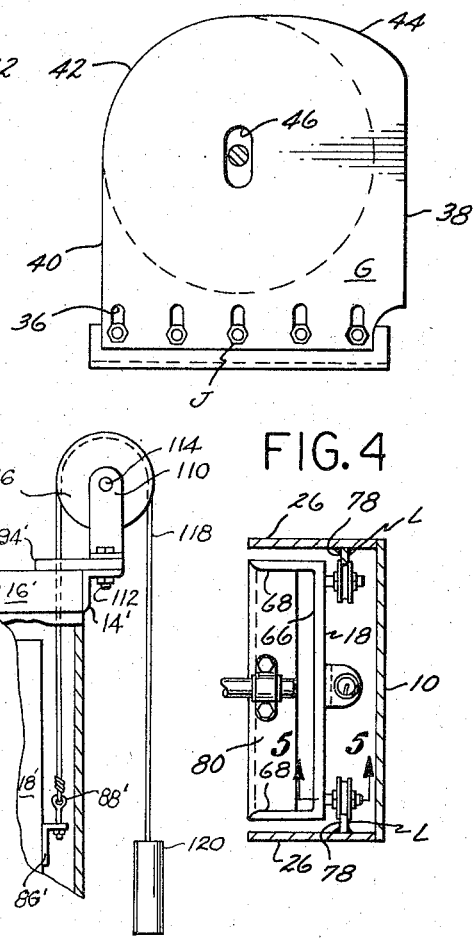
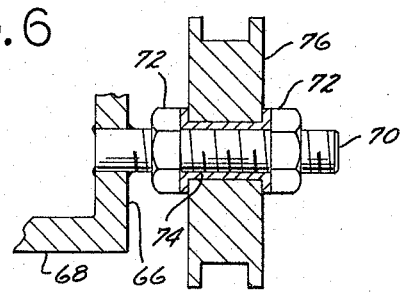

United States Patent Office 3,307,297
Patented Mar. 7, 1967

3,307,297
SURFBOARD FORMING APPARATUS AND METHOD OF USING SAME
Mark E. Lawson, Cocoa Beach, Fla.
(85 Mahiloa Place, Kailua, Oahu, Hawaii 96734)
Filed Sept. 21, 1964, Ser. No. 397,964
9 Claims. (Cl. 51—80)

The present invention relates generally to the field of power-driven forming devices, and more particularly to a surfboard forming apparatus and method of using the same that automatically shapes two elongate blocks transversely to a desired curvature when they are bonded to opposite sides of an elongate rigid member, but also shapes the blocks longitudinally to a profile which is determined by the longitudinal configuration of the rigid member.

In the manufacture of modern surfboards, a core is first provided that includes an elongate rigid member having a desired longitudinal profile, with two blocks of a buoyant material bonded to opposite sides thereof. Prior to the present invention the buoyant blocks on each side of this rigid member have had to be shaped manually to impart the desired longitudinal and transverse curvature thereto whereby they will conform to the profile of the elongate member. Such an operation is not only tedious and time consuming, but do to the hand labor involved, no two cores were ever precisely the same shape. After the cores were shaped in the manner described, they were enveloped in one or more films of a tough, waterproof material such as a polymerized resin impregnated with fibreglass to provide the finished surfboard.

A primary object in devising the present invention is to provide a forming apparatus and method of using the same for the manuafcture of surfboard cores in a minimum of time and expense, with the assurance that the cores so formed will be of uniform shape and configuration.

Another object of the invention is to provide a forming apparatus of relatively simple mechanical structure which is simple and easy to operate, can be fabricated from standard, commercially available materials, and requires a minimum of maintenance attention.

These and other objects and advantages of the invention will become apparent from the following description thereof, and from the drawings illustrating the same, in which:

FIGURE 1 is a front elevational view of the forming apparatus;
FIGURE 2 is a side elevational view of the apparatus;
FIGURE 3 is a fragmentary vertical cross-sectional view of the apparatus, taken on the line 3—3 of FIGURE 1;
FIGURE 4 is a transverse cross-sectional view of the forming apparatus, taken on the line 4—4 of FIGURE 2;
FIGURE 5 is a fragmentary enlarged cross-sectional view of a portion of the apparatus, taken on the line 5—5 of FIGURE 4; and
FIGURE 6 is a combined front elevational and vertical cross-sectional view of a portion of a modified form of the apparatus.

With continuing reference to the drawings for the general arrangement of the invention, it will be seen to include a base A that is affixed to a floor B, or other supporting surface, by conventional means (not shown). Base A supports an upwardly extending rigid frame C comprising two laterally spaced uprights 10, the upper portions of which are connected by pairs of angle irons 12 and 14, as may best be seen in FIGURES 1 and 2.

An inverted yoke D is disposed between the upper portions of uprights 10, which yoke includes a horizontal cross member 16, from the ends of which two vertical legs 18 depend. An upper vertical template guide E is situated between legs 18, and two upper rotatable cutting members F which are coaxially aligned, are situated on opposite sides of upper template guide E, as shown in FIGURE 1. A lower template guide G is in vertical alignment with upper guide E, but spaced downwardly therefrom, and two lower coaxially aligned, rotatable cutting members H are positioned on opposite sides of guide G. First means J are provided for vertically adjusting the lower template guide G relative to the lower cutting members H, which are concurrently driven by second power means K, best seen in FIGURE 1.

The inverted yoke D is vertically guided relative to the uprights 10 by third means L (FIGURES 2 and 4), and fourth means M are supplied for vertical adjustment of the upper template guide E relative to the yoke D. The upper cutting members F are driven concurrently by fifth power means N.

The rough core O that is to be shaped for the surfboard includes an elongate, rigid member P which is preferably of wood and finished into the desired longitudinal profile comprising the center of the surfboard. The lower edge 20 of the members P (FIGURE 1) is normally relatively flat, with the upper edge 22 thereof usually having a substantial longitudinal curve, depending upon the surfboard profile desired.

Two identical elongate blocks of a material which is adapted to be cut, such as polyurethane, are bonded to the opposite longitudinal sides of member P. Each of the blocks 24 is of a greater thickness and width than that required for the finished core. The rigid member P serves a two-fold purpose; that of holding the two blocks 24 together in a fixed relationship, and also serving as a template for longitudinal shaping of the core as the rough core O is passed longitudinally through the apparatus, as best seen in FIGURE 2, to form the finished core O'.

As the rough core O is passed longitudinally through the apparatus from left to right (FIGURE 2), the upper cutting members F are concurrently driven in a clockwise direction, and the lower cutting members H in a counter-clockwise direction.

A lower guide shoe Q is provided (FIGURE 2) which extends transversely between the two uprights 10 and slidably engages the lower surface of the finished core O' as it moves to the right from between the upper cutting members F and lower cutting members H. An upper transverse guide shoe R extends transversely between the legs 18 which is so disposed as to slidably engage the upper surface of the finished core O' after it has moved to the right from between the upper cutting members F and lower cutting members H. The lower and upper guide shoes Q and R, together with the template guides E and G respectively, cooperatively maintain the core O in a substantially fixed plane as the core is being shaped during passage thereof from left to right between the cutting members F and H, as shown in FIGURE 2.

As to the detailed structure of the forming apparatus of the present invention, each of the uprights 10 is preferably of a channel-shaped transverse cross section and includes two laterally spaced, inwardly extending flanges 26. Two horizontal cross members 28 are rigidly affixed by conventional means to the exterior surface of flanges 26 and extend transversely across the apparatus, as shown in FIGURES 1 and 2. A third horizontally positioned angle iron 30 extends between cross members 28, which includes a vertical flange 32 shown in FIGURES 1 and 3. A number of longitudinally spaced vertical slots 36 are formed in flange 32 through which bolts 34 project.

The lower template guide G is preferably formed from a rigid sheet material such as steel, or the like, and has a vertically extending rear edge 38 and forward vertical edge 40. The forward edge 40 of guide G develops into a curved portion 42 of substantially the same radius of curvature as that of the lower cutting members H. The curved portion 42 develops into a downwardly and rearwardly extending curved edge 44 that merges with the rear edge 38, as can best be seen in FIGURE 3.

The center of the lower template guide G is provided with a vertically extending, centrally disposed slot 46. The bolts 34, when supported on the third angle iron 30, extend through the slots 36 in the lower template guide G, and loosening and then tightening of nuts 47 which engage the bolts 34 permits vertical adjustment of the lower template guide G to a desired height relative to the frame C.

Two inverted L-shaped cross pieces 48 are provided, that are horizontally positioned and extend between the flanges 26 of the uprights 10, as best seen in FIGURE 1. Cross pieces 48 serve to support two transversely aligned journal boxes 50 that rotatably support a horizontal shaft 52. The lower cutting members H preferably comprise conventional cylindrical sanding drums, affixed to shaft 52 by conventional means.

The second means K for driving the shaft 52 and concurrently rotating the lower cutting members H includes a grooved driven pulley 54 affixed to the shaft 52, which driven pulley is engaged by a flexible endless belt 56. Belt 56 is also engaged by a grooved driving pulley 58 mounted on a shaft 60 which is driven by an electric motor 62. Base A supports motor 62 by a conventional mounting 64, as illustrated in FIGURE 1.

Each of the legs 18 of the yoke D is of channel-shaped transverse cross section and includes a web 66 and two flanges 68 which project inwardly from the ends thereof, as shown in FIGURE 4. Two pairs of threaded rods 70 project outwardly from each web 66, as may best be seen in FIGURES 2, 4, and 5. Two nuts 72 are threaded on each of the rods 70 and grip a bushing 74 therebetween. Each bushing 74 rotatably supports a grooved roller 76. The third means L for vertically guiding the yoke D relative to the frame C includes a roller 76, and two vertically extending rails 78 that are rigidly affixed to the interior surfaces of the flanges 26 by conventional means, as shown in FIGURE 4.

Two horizontal angle iron cross pieces 80 are rigidly affixed to the interior surfaces of the flanges 68 and extend therebetween, as best seen in FIGURES 1 and 4. The cross pieces 80 support two transversely aligned journal boxes 82 that rotatably support the end portions of a shaft 84. The upper template guide E is identical in structure to the lower guide G, and accordingly, a detailed description of the upper guide is unnecessary. The same numerals used in identifying the construction of lower guide G are used in the drawings for the same purpose on the upper guide E, but to which primes have been added.

The fourth means M for adjustably supporting the upper template guide E is identical in structure to the first adjustable means J, and accordingly will not be described in detail. Rather, the same numerals used in identifying the components of first adjustable means J in the drawings are used in identifying similar elements of the fourth means M, except that primes have been affixed thereto.

The angle iron 32′, as can best be seen in FIGURE 1, is affixed to the under portion of the cross member 16 by conventional fastening means. The upper template guide E also has a centrally disposed, elongate slot 46′ formed therein, through which the shaft 84 projects, which slot permits the upper template guide E to be vertically adjusted relative to the yoke D.

The two upper cutting members F comprising sanding drums are rigidly affixed to the shaft 84 by conventional fastening means. The exterior surfaces of cutting members F curve outwardly from one another in opposite directions to impart a convex surface to the upper portions of the blocks 24 as they are brought into contact with the rotating surfaces of the drums. An L-shaped bracket 86 is rigidly affixed to each of the legs 18. Each of the brackets 86 (FIGURE 1) is engaged by an eye-bolt 88, which eye-bolt is connected to the lower end of a helical spring 90. The upper end of the spring 90 is affixed to the lower end of a threaded rod 92 that projects downwardly through a bar 94 which extends inwardly from one of the angle irons 14, as best seen in FIGURE 1. Each of the rods 92 projects downwardly through a straight-surfaced bore 96 formed in bar 94.

A nut 98 engages the threaded rod 92, and by rotation of this nut, the rod 92 may be raised or lowered relative to frame C to increase or decrease the tension on spring 90. Rotation of nuts 98 in the appropriate direction increases the tension on springs 90 to lessen the load exerted by the upper cutting members F on the blocks 24 as they move from left to right between the upper and lower cutting members (FIGURE 2).

The fifth power means N includes an electric motor 100 that is supported by a conventional mounting 101 from the cross member 16. Motor 100 is provided with a driven pulley 102 that engages an endless belt 104, which in turn engages a driven pulley 106 rigidly affixed to shaft 84.

The method of using the apparatus of the present invention is relatively simple. The elongate member P is cut to the length the finished surfboard (not shown) is to be, and the lower and upper edges 20 and 22, respectively, thereof shaped longitudinally to the desired curvature of the finished surfboard. Two elongate blocks 24 of a buoyant material are bonded to opposite sides of the member P. In some instances it may be desirable to purchase the member P with the blocks roughly formed, already affixed thereto.

The motors 62 and 100 are supplied with electrical energy through conductors 62a and 100a respectively. When the motors 62 and 100 are energized, they drive the cutting members F and H. The rough core O is then manually fed through the apparatus as shown in FIGURE 2 from left to right, with the edges 20 and 22 of member P slidably engaging the lower and upper edges of the template guides E and G, respectively. Prior to use of the apparatus the template guides G and E are adjusted by the power means J and M so that the upper extremity of template guide G is flush with the upper adjacent portions of cutting members H and the lower extremity of template guide E is flush with the lower adjacent portions of cutting members F.

As the rough core O is advanced through the apparatus, the member P, due to the longitudinal configuration of the upper surface 22 thereof, serves as a template to move the cutting members F upwardly and downwardly relative to frame C to impart a desired curved configuration (curvature) to the rough core O and provide a finished core O′. Concurrently with the longitudinal movement of the rough core O through the device, the concave curved surfaces of the cutting members F and the relatively straight surfaces of the cutting members H impart a desired transverse configuration to the rough core to provide the finished core O′. Although the core O′ is referred to as "finished," the longitudinal edge portions thereof are still in the rough state and must be hand-shaped to bring them into the configuration shown in phantom line 108, best seen in FIGURE 1.

A modified form of the apparatus is shown in FIGURE 6, which does not include the springs 90, threaded rods 92, and nuts 98, although the balance of the device remains the same. Two brackets 110 are secured to bars 94 by bolt and nut assemblies 112, and each bracket supports a stub shaft 114 on which a pulley 116 is rotatably mounted. Each pulley is engaged by a cable 118 that extends downwardly through bore 96 to one of the eye-bolts 88 to which an end portion thereof is affixed by conventional means. A counterweight 120 is affixed to the opposite end portion of each of the cables 118, as can best be seen in FIGURE 6. The counterweights 120 are so selected that the cables 118 exert a desired upward force on the upper cutting member F, and serve the same function as the springs 90. The elements comprising the modified form of the apparatus shown in FIGURE 6 that are common to the form thereof first described, are identified by the same numerals, but to which a prime has been added.

Although the present invention is fully capable of achieving the objects and providing the advantages hereinbefore mentioned it is to be understood that it is merely illustrative of the presently preferred embodiment thereof and I do not mean to be limited to the details of construction herein shown and described, other than as defined in the appended claims.

I claim:

1. An apparatus for forming two elongate blocks of a buoyant material, the adjacent longitudinal sides of which are bonded to an elongate rigid member to permit at least the upper surfaces of said blocks to curve transversely as well as longitudinally in conformity with the longitudinal profile of said member to define the core for a surfboard, comprising:
    (a) a frame including two vertical, laterally spaced uprights;
    (b) a lower vertical template guide intermediately disposed between said uprights which supports said rigid member by slidably engaging a lower longitudinal surface thereof;
    (c) two lower rotatable, coaxially aligned, lower cutting members disposed on opposite sides of said lower template guide;
    (d) first means for adjustably supporting said lower guide from said frame to dispose an upper edge of said lower guide flush with upper extremities of said lower cutting members;
    (e) second means for concurrently driving said lower cutting members as said rigid member is moved longitudinally over said lower guide, with said blocks being subjected to said lower cutting members to permit the lower surfaces of said blocks to be shaped to the longitudinal profile of the lower edge of said rigid member;
    (f) an inverted yoke disposed between said uprights;
    (g) third means for guiding said yoke vertically relative to said frame;
    (h) an upper vertical template guide disposed within said yoke and in vertical alignment with said lower template guide;
    (i) fourth means for adjustably supporting said upper template guide from said yoke to permit the lower edge of said upper template guide to slidably engage the upper surface of said rigid member;
    (j) two upper rotatable, coaxially aligned cutting members positioned on opposite sides of said upper template, said upper cutting members being oppositely curved to shape the upper surfaces of said blocks to a desired transverse curved profile as said blocks and elongate member are moved between said upper and lower cutting members; and
    (k) fifth means supported from said yoke for concurrently driving said upper cutting members, with said upper cutting members also longitudinally shaping the upper surfaces of said blocks to the profile of the upper surface of said rigid member as said rigid member and blocks are moved longitudinally between said upper and lower cutting members.

2. An apparatus as defined in claim 1 which further includes sixth means that cooperate with the upper edge of said lower template guide to hold said blocks and elongate member in a fixed plane as said blocks and elongate member are moved between said upper and lower cutting members.

3. An apparatus as defined in claim 2 which further includes seventh means for adjusting the pressure exerted by said upper cutting members on the upper surfaces of said blocks as said blocks and elongate member are moved between said upper and lower cutting members.

4. An apparatus as defined in claim 1 which further includes a lower horizontal shaft rotatably supported from said frame and to which said lower cutting members are affixed, with said lower template guide having a vertically extending slot formed therein through which said shaft extends, and said first means comprising:
    (a) an angle iron member disposed below said lower cutting members in a direction normal relative thereto, said member having an upwardly extending flange in which a vertical slot is formed;
    (b) a bolt that extends through a bore in said lower template guide, and is slidably adjustable in said vertical slot; and
    (c) a nut that engages said bolt, with said nut when tightened on said bolt frictionally gripping said lower template guide between said flange and nut to support said lower template guide at a desired elevation relative to said lower cutting members.

5. An apparatus as defined in claim 4 wherein said second means comprises:
    (a) a prime mover mounted on the lower portion of said frame;
    (b) a first sheave driven by said prime mover;
    (c) a second sheave rigidly affixed to said lower shaft; and
    (d) an endless belt that drivingly connects said first sheave to said second sheave.

6. An apparatus as defined in claim 4 wherein said third means comprise:
    (a) a plurality of vertically aligned grooved rollers rotatably supported from said yoke; and
    (b) at least one vertically disposed rail supported from said frame that is engaged by said grooved rollers.

7. An apparatus as defined in claim 4 which further includes:
    (a) two laterally spaced threaded rods that are movably mounted on the upper portion of said frames;
    (b) two helical springs connected to the lower ends of said rods and to said yoke;
    (c) two horizontal bars mounted on the upper portion of said frame, said bars having vertical bores formed therein wherein said threaded rods are vertically movably; and
    (d) two nuts that engage said threaded rods and rest on said bars, which nuts when rotated relative to said threaded rods increase or decrease the tension on said springs to control that portion of the weight of said yoke, upper template guide and upper cutting members to which said blocks are subjected as said blocks are formed in passing through said apparatus.

8. An apparatus as defined in claim 1 which further includes an upper horizontal shaft rotatably supported from said yoke and to which said upper cutting members are affixed, with said upper template guide having a vertically extending slot formed therein through which said upper shaft extends, and said fifth means comprises:
    (a) an angle iron member affixed to said yoke above said upper cutting members, said angle iron member including a vertically disposed flange;
    (b) a bolt that extends through a bore formed in said upper template guide and is slidably adjustable in said vertical slot in said flange; and
    (c) a nut that engages said bolt, with said bolt frictionally gripping said upper template guide between said flange and nut to support said upper template guide at a desired elevation relative to said upper cutting members.

9. An apparatus as defined in claim 4 which further includes:
    (a) two pulleys rotatably supported on opposite upper sides;
    (b) two cables having first end portions thereof affixed to opposite upper side portions of said yoke, which cables extend upwardly from said yoke over said pulleys and downwardly therefrom to terminate in second end portions; and (c) two counterweights affixed to said second end portions, which counterweights are of such weight as to control to a desired degree that portion of the weight of said yoke, upper template guide and upper cutting member to which said blocks are subjected as said blocks are formed in passing through said apparatus.

References Cited by the Examiner

UNITED STATES PATENTS

| | | | |
|---|---|---|---|
| 721,935 | 3/1903 | Duncke | 51—80 X |
| 2,040,720 | 5/1936 | Wanko | 51—80 |
| 2,671,992 | 3/1954 | Reaser | 51—80 |
| 2,901,868 | 9/1959 | Price | 51—80 |

ROBERT C. RIORDON, *Primary Examiner.*

D. G. KELLY, *Examiner.*